Patented Feb. 21, 1928.

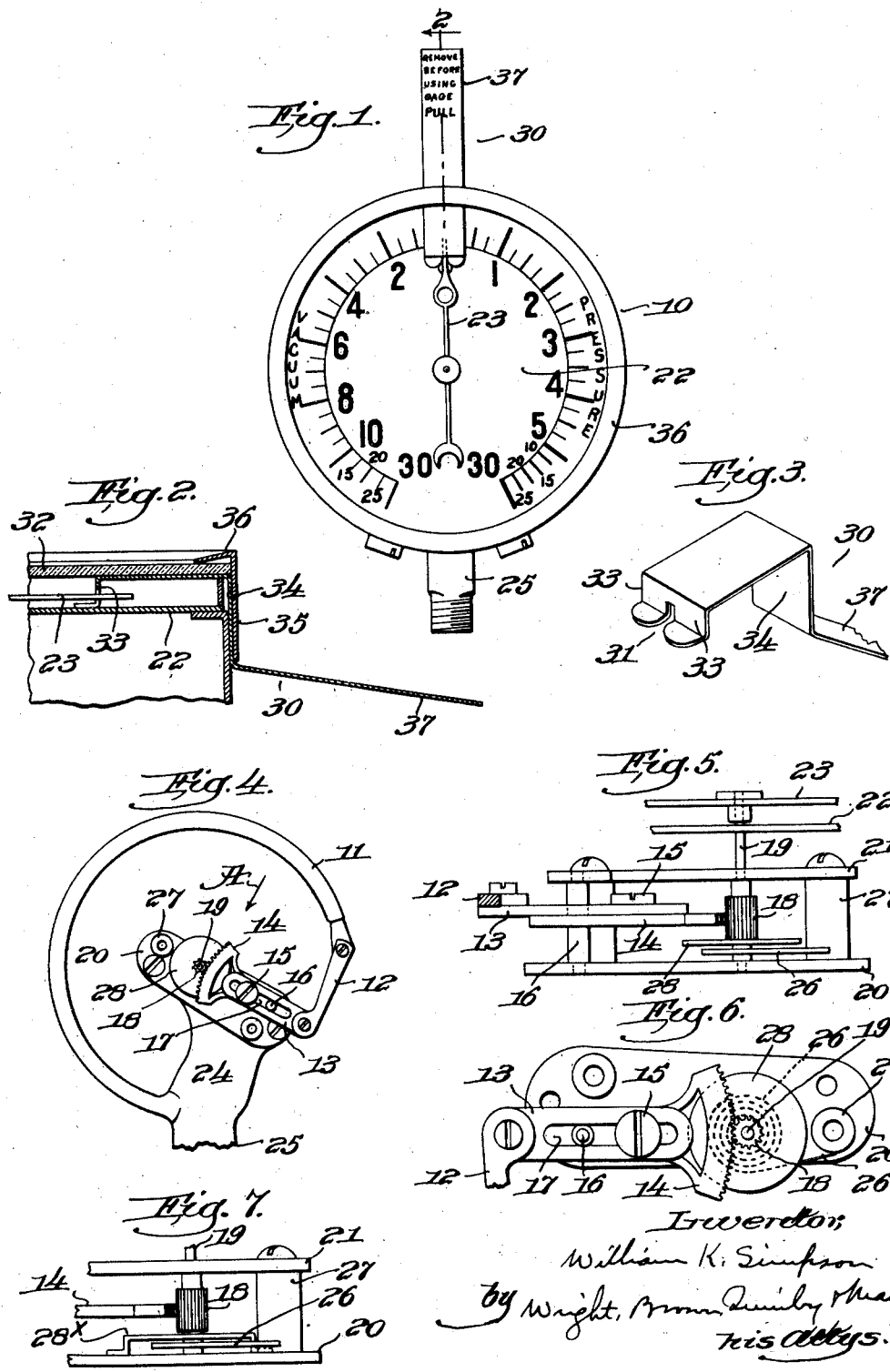

1,659,670

UNITED STATES PATENT OFFICE.

WILLIAM K. SIMPSON, OF WATERBURY, CONNECTICUT, ASSIGNOR TO HOFFMAN SPECIALTY COMPANY, OF WATERBURY, CONNECTICUT, A CORPORATION OF ILLINOIS.

PROTECTING DEVICE FOR GAUGES.

Application filed March 17, 1925. Serial No. 16,207.

This invention relates to measuring instruments including gauges such, for instance, as are used in indicating pressure or vacuum, and particularly to that class of gauges having an indicator which is actuated by sensitive, delicately constructed mechanism and including the type known as the Bourdon spring tube gauge.

It is an object of the invention to prevent the disarrangement of certain delicate mechanism of the gauge resulting from rough and careless handling, especially when it is being shipped and subjected to sudden and violent jarring.

It is a further object of the invention to so construct a portion of the disarrangement preventing means, and so assemble it with the gauge, that it constitutes a temporary device readily removable prior to installing the gauge for use.

Another object of the invention is to provide a gauge with certain other disarrangement preventing means permanently attached to, or installed in it, and which continuously functions during the use or life of the gauge.

Heretofore in the handling and shipping of gauges, not provided with disarrangement preventing means, considerable trouble has been experienced, due to sudden jars and violent concussion while in transit, which caused the hair spring of the gauge to become disarranged and oftentimes tangled with the pinion on the staff of the indicator, or its actuating segment.

In other instances wherein a gauge of delicate construction, such as shown herewith, had a very sensitive Bourdon tube, and of which a nicety of indication was required, it has been found that sudden and violent jarring has caused a disarrangement of the tube, at least sufficiently to impair the accuracy of the gauge and require its return to the factory for adjustment.

The present invention contemplates the use of certain simple and inexpensive devices to prevent the above occurrences, and it will be understood that it is not the intention to limit the invention to the precise construction and arrangement shown herewith as it is possible to make changes therein without departing from its spirit and scope.

Of the drawings:

Figure 1 represents a face view of one form of gauge to which the invention is applied.

Figure 2 is a section of a portion of the gauge taken on the line 2—2 Figure 1.

Figure 3 is a perspective view of a portion of one of the devices concerned in the invention.

Figure 4 is an enlarged face view of the Bourdon tube spring showing its connections with the indicator operating mechanism.

Figure 5 is an enlarged view of certain portions of Figure 4 looking in the direction of arrow A.

Figure 6 is a top plan view of Figure 5, certain portions being omitted for clearness.

Figure 7 is a detail to be referred to.

Like characters represent like parts throughout the several figures of the drawings.

The drawings herewith represent the invention as applied to one form of a delicate gauge, but it will be understood that it may be applied to other gauges, and similar instruments equipped with pointers and the like at but slight cost in time and labor.

The casing 10 encloses in usual and well known manner the Bourdon spring tube 11, to the free end of which a link 12 is pivotally attached, said link being also pivotally connected to an adjustable arm 13 which is secured to a gear segment 14 by means of screw 15.

The segment 14 is fast to a pivot stud 16 which passes through the elongated slot 17 of the adjustable arm 13, the said segment meshing with the pinion 18 fast with the indicator staff 19. Pivot 16 and staff 19 are rotatable in bearings in the plates 20 and 21, see Figure 5 of the drawings, wherein is also shown a portion of the dial 22 through which the said shaft 19 passes, and a portion of the indicator or pointer 23.

The plate 20 is secured to a portion of a casting 24 forming part of the fixture or socket 25 to which the said tube 11 is secured and with which it is in communication.

The structure thus far explained is usual and well known in gauges of this type, that here illustrated being designed to indicate both pressure and vacuum.

The hair spring 26, the presence and function of which is also well known in gauges of this type, has as usual one of its ends fast to the revoluble staff 19, and its other end fast to a stationary part such as the post 27, and is located in close proximity to the pinion 18 and segment 14.

Interposed between the pinion 18 and said spring 26 and preferably, but not necessarily, fast to the shaft 19 is a shield 28 designed to loosely confine the said spring between it and the plate 20, to thus prevent accidental side whipping of the spring and its consequent entanglement with the pinion 18, segment 13, or between them.

Figure 7 shows a modified form of shield 28 made in the form of a bridge and arranged to be secured to the plate 20 by suitable fastening means and having an opening through it to embrace and permit free movement of the staff 19.

The shield above described is a permanent part of the gauge, and continuously functions as intended, and because of its use, a gauge of this type may be subjected to a considerable amount of rough handling and usage without fear of disarranging the spring to the extent of putting the gauge out of commission, which in some instances would be a very serious mishap.

Another important feature of the invention, and one which is introduced into the gauge during the assembling thereof, and which is intended to remain in place until the gauge is put to use, and then to be removed is a locking device 30 for the indicator 23.

Said locking device is made of a thin and relatively wide strip of sheet metal, for instance, copper ribbon stock. It is thin enough to be mounted and clamped in the manner presently described, and preferably is flexible also; while it is wide enough to have substantial stiffness in the directions of its width. This strip is slotted inward from one end at 31 (Fig. 3) and is bent so that the portions or legs flanking the slot may extend across the pointer and across the plane in which the pointer moves. As here shown, the portions 33 are of a length substantially equal to the space between the dial 22 and the crystal 32 of the gauge, but this is a detail from which departure may be made. The strip or ribbon is further bent to form a portion 34 spaced apart from the legs 33 a distance somewhat greater than the shortest distance from the pointer to the adjacent side of the casing, such portion 34 being adapted to lie close to the outer surface of the casing and to be clamped between the same and the flange or rim 35 of the bezel or ring 36 which holds the crystal in place. Beyond the part 34, the end of the strip extends outwardly from the rim or flange 35 far enough to form a handle portion whereby it may be grasped and pulled out to release the pointer.

This lock is applied as shown in Figs. 1 and 2, with its slot 31 receiving the end of the pointer, its legs 33 embracing such end, the portion 34 lying against the side wall of the gauge and clamped between said wall and the encircling flange of the bezel, and the connecting portion between the legs 33 and the part 34 extending along the under side of the crystal and close to the surface thereof. In the broad sense, the bezel and crystal together constitute a removable cover for the gauge having a flange coacting with the casing, and the lock is secured in place by being gripped between the overlapping casing wall and cover flange, extending thence to embrace and confine the pointer by means of its slotted or forked end.

Being thin, as above stated, the locking strip or ribbon readily passes between the overlapping parts of the case and cover, even though these parts are closely fitted together; and, being flexible, it will, when pulled outward, yield and bend readily and slip through the space in which it is confined. Thus it may be withdrawn when the gauge is put in operation without requiring the cover of the gauge to be first taken off. At the same time, it is rigid enough, and is clamped firmly enough, to prevent movement of the pointer due to the jars and shocks of rough handling of the gauge, by virtue of the fact that it is wide, that its width extends in the directions in which only the pointer can move, that it is closely confined between the case and cover, that its length is short between its pointer-engaging and clamped portions, and that it is so confined as to be restrained from twisting.

In practice, when the gauge is packed for shipment, the external portion 37 of the locking device 30 may be folded over the top of the gauge or under the bottom thereof.

Locking of the pointer in this fashion prevents any such movement being imparted to the spring tube 11 by sudden shocks or jars as would be liable to give it a permanent set, out of proper position, and so impair its accuracy and displace the pointer from its intended and correct relation to the dial.

That phase of the invention which is embodied in the pointer lock is obviously applicable to various instruments, other than Bourdon spring gauges, which are equipped with indicating hands or pointers and are liable to disarrangement under the conditions hereinbefore referred to.

Having described the invention I claim:

1. A measuring instrument comprising a casing, a movable indicating pointer, and a lock engaged in a normally rigid manner with said casing, but being removable therefrom, and having a forked end embracing said pointer.

2. A measuring instrument comprising a casing and a removable cover having overlapping parts, an indicator movably mounted in said casing, and a locking strip extending and clamped between the overlapping parts of said casing and cover and having a portion interlocked with said pointer to prevent movement thereof.

3. A measuring instrument comprising a casing and a removable cover having overlapping parts, an indicator movably mounted in said casing, and a locking strip extending and clamped between the overlapping parts of said casing and cover and having a portion interlocked with said pointer to prevent movement thereof, said lock having a handle portion extending outside of the gauge and being sufficiently flexible and yielding to permit of removal by pulling outward on said handle portion.

4. In a measuring instrument having a case, a pointer, mechanism for actuating said pointer, and a cover formed with a flange to coact with and overlap the walls of the case, a lock for said pointer consisting of a ribbon or strip of sheet material passing between and gripped by the overlapping walls of the case and cover, and projecting thence inwardly into engagement with the pointer, said strip having width and stiffness sufficient to prevent movement of the pointer.

5. A measuring instrument comprising a casing; an indicator; means to actuate said indicator; and a lock for said indicator comprising a flexible member removably assembled with said casing and arranged to engage said indicator and having a portion extending externally of said casing.

6. A measuring instrument comprising a casing; a cover therefor, an indicator; actuating means for said indicator; and a locking means for said indicator comprising a strip of thin material arranged to be confined between said cover and said casing and one end thereof arranged to engage said indicator to prevent movement thereof and its other end projecting outside of the casing and providing a hand grip whereby said strip may be withdrawn from its assembled position to unlock said indicator.

7. In a measuring instrument having a case, a pointer, mechanism for actuating said pointer and a cover formed with a flange embracing the walls of the case, a lock for said pointer consisting of a strip of thin flexible metallic ribbon stock passing between the wall of the case and flange of the cover and gripped thereby, having one end protruding from the casing and the other end projecting inward into engagement with the pointer.

8. In a measuring instrument having a case, a pointer, mechanism for actuating said pointer and a cover formed with a flange embracing the walls of the case, a lock for said pointer consisting of a strip of thin flexible metallic ribbon stock passing between the wall of the case and flange of the cover and gripped thereby, having one end protruding from the casing and the other end projecting inward into engagement with the pointer, said strip having its width extending in the same directions as the path of movement of the pointer.

9. In a measuring instrument having a case, a pointer, mechanism for actuating said pointer and a cover formed with a flange embracing the walls of the case, a lock for said pointer consisting of a strip of thin flexible metallic ribbon stock passing between the wall of the case and flange of the cover and gripped thereby, having one end protruding from the casing and the other end projecting inward into engagement with the pointer, said strip having its width extending in the same directions as the path of movement of the pointer and formed with separated legs at its inner end embracing the pointer and with a portion between such legs and the gripped part lying close to the overlying part of the cover.

10. In a device of the kind described and in combination, an indicating instrument including a casing, a dial, a cover plate, retaining means for the cover plate, an indicator hand arranged between the dial and cover plate and movable over the dial, and a sealing member extending between said retaining means and casing and within the inner face of the cover plate to a point adjacent the indicator hand, and thence extended to the dial and resting thereon, said last-mentioned extending portion provided with a slot detachably receiving the indicator hand, said sealing member having a portion extended to the exterior of the casing, whereby the same may be withdrawn without removing the cover plate.

11. A measuring instrument comprising a casing, a movable indicator therein, means to actuate said indicator, and a lock engaged substantially rigidly with said casing but adapted to be removed therefrom, extending inwardly from the casing into movement-preventing engagement with the indicator.

In testimony whereof I have affixed my signature.

WILLIAM K. SIMPSON.